(12) United States Patent
Kuroda et al.

(10) Patent No.: US 7,245,976 B2
(45) Date of Patent: Jul. 17, 2007

(54) FIELD APPARATUS

(75) Inventors: Masato Kuroda, Tokyo (JP); Yasuo Kumeda, Tokyo (JP); Shinichi Akano, Tokyo (JP); Fumio Nagasaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 88 days.

(21) Appl. No.: 10/480,122

(22) PCT Filed: Jun. 6, 2002

(86) PCT No.: PCT/JP02/05595

§ 371 (c)(1),
(2), (4) Date: Aug. 23, 2004

(87) PCT Pub. No.: WO02/101682

PCT Pub. Date: Dec. 19, 2002

(65) Prior Publication Data
US 2005/0013254 A1    Jan. 20, 2005

(30) Foreign Application Priority Data
Jun. 11, 2001 (JP) .............................. 2001-175249

(51) Int. Cl.
G05B 9/02 (2006.01)
G06F 11/00 (2006.01)
G01R 31/08 (2006.01)
H02H 3/00 (2006.01)
H04L 12/50 (2006.01)

(52) U.S. Cl. .................. 700/79; 370/241; 370/362; 370/225; 370/465; 340/870.13; 324/551

(58) Field of Classification Search ............... 700/79; 324/551; 370/225, 465; 340/870.13; 702/83
See application file for complete search history.

(56) References Cited

U.S. PATENT DOCUMENTS

| 5,301,128 | A | * | 4/1994 | Bybee | 702/83 |
| 5,412,643 | A | * | 5/1995 | Kogure | 370/225 |
| 5,420,578 | A | * | 5/1995 | O'Brien et al. | 340/870.13 |
| 5,652,521 | A | * | 7/1997 | Meyer | 324/551 |
| 5,682,476 | A | * | 10/1997 | Tapperson et al. | 370/225 |
| 6,738,388 | B1 | * | 5/2004 | Stevenson et al. | 370/465 |

FOREIGN PATENT DOCUMENTS

| JP | 5-76077 | 3/1993 |
| JP | 8-178788 | 7/1996 |
| JP | 7-319533 | 12/1996 |
| JP | 11-088382 | 3/1999 |

* cited by examiner

Primary Examiner—Anthony Knight
Assistant Examiner—Sunray Chang
(74) Attorney, Agent, or Firm—Jordan and Hamburg LLP

(57) ABSTRACT

A field apparatus for controlling a controlled element includes a diagnosis unit for diagnosing abnormality of the field apparatus and/or the controlled element and a bidirectional digital communication device to send a digital signal which shows a diagnosis result to outside and to receive a digital signal from outside in order to execute a control of the controlled element. Other predetermined functions are effected based on a command signal in the form of an analog signal received from outside by a analog communications device of the apparatus. Electric power for operation is supplied through a switching means that can switch either a electric power that is supplied by the analog communications device or a electric power that is supplied by the bidirectional digital communication device.

15 Claims, 5 Drawing Sheets

FIELD APPARATUS

BACKGROUND

The present invention relates to a positioner having a communication function.

Generally in a control system operating a control apparatus of valves by remote control, detection signals from field apparatuses measuring a quantity of physics such as flow quantity, pressure force and temperature are gathered to a controller as a superior apparatus, the controller operates opening and shutting of valves by remote control based on those detection signals. In the control system, generally a communication cable of 4-20 mA is used as a transmission channel transmitting the detection signal from a detection port of field apparatuses to the controller and transmitting a control signal from the controller to an operation port of valves. The controller receives an analog signal (following, "4-20 mA signal") with an electric current of 4-20 mA normalized to 0-100% from the detection port by this communication cable. Further it establishes a PID parameter so that a detection data in the detection port will become a predetermined target value (set point) at every operation port. And it sends the 4-20 mA signal as the control signal normalized to 0-100% towards the operation port.

In late years, a field apparatus including a function transmitting diagnosis information of a valve and itself to the controller in addition to the control function of the valve has been introduced. As an example of such a field apparatus, there is a positioner disclosed by Japanese Patent Laid-Open No. 1-141202. According to this, because the diagnosis result of valve and itself are transmitted to the controller via a transmission channel, the controller can analyze the diagnosis result and take corresponding action. Therefore a bidirectional digital communication of field bus communications (hereinafter "FB communication") is used and the control system having the bidirectional digital communication replaces the control system of the conventional analog communication. In such a digital control system, in addition to operating by remote control the operation port of valves as before, the controller instructs the diagnosis of the valve and a diagnosis of the field apparatus itself by remote control and it manages each field apparatus by acquiring the diagnosis information. In the control system having the FB communication described, it is an advantage that setting the maintenance of the valve and the field apparatus are easy.

However, it is needed to exchange the interface of all apparatuses to the interface for FB communication from the existing interface for 4-20 mA communication in order to change the existing control system using the communication cable of 4-20 mA to the control system by the FB communication. Moreover, very many costs are needed in a change of such the system.

Moreover, in the control system using the FB communication, because the control information that operates by remote control of the operation port and the diagnosis information of the apparatus intermingle, the inside of the transmission channel is crowded by the transmission information and interference may influence the control.

SUMMARY OF THE INVENTION

It is an object of the present invention to provide a field apparatus, such as a positioner, which can introduce a control system using digital communication easily without wasting the control system having the existing 4-20 mA communication, and can transmit information between an outside device and an operation port precisely and speedily.

The present invention provides a field apparatus in the form of a positioner comprising an analog communications means that can receive an analog signal from outside and elements for executing control of a controlled element and other predetermined functions based on a command signal received by the analog communications means. The field apparatus of the present invention is characterized by a positioner comprising a diagnosis unit diagnosing abnormality of the positioner or the controlled element and a bidirectional digital communication means to send a digital signal which shows the diagnosis result to outside and to receive the digital signal from outside.

An embodiment of the present invention comprises a switching means (for example, a power supply changeover unit 18 of FIG. 2) that can switch either a electric power that is supplied by the above analog communications means or a electric power that is supplied by the above bidirectional digital communication means for use as the electric power for the field apparatus operation.

Another embodiment uses either a power supply from the analog communications means or a power supply from the bidirectional digital communication means as the electric power for the positioner operation and if the power supply in use runs out, it comprises an automatic switching means (for example, an automatic changeover switch 53 of FIG. 5) that can switch to the other power supply automatically.

According to the present invention, the existing equipment can be utilized without setting up new communication equipment in order to control controlled objects such as valves because communication with the existing control system is possible by the analog communications means. At the same time an advantage of the bidirectional communication setting a controlled object such as a valve and the bidirectional communication of diagnosis of the positioner itself or the controlled object is provided by utilizing the digital communication with the outside by the bidirectional digital communication means. Moreover, because management/diagnosis information of the control information and the apparatus does not intermingle, congestion of the transmission channel is prevented and possible interference with the control is prevented.

According to the embodiment of the present invention, it can switch optionally either the electric power supplied by the analog communications means or the electric power supplied by the bidirectional digital communication means for use as the electric power for the positioner operation. Therefore, if the power supply by the FB communication is stopped, the electric power is secured by switching to the power supplied by the analog communication, and adverse influence to the control of the controlled object can be prevented.

According to another embodiment, if the power supply in use runs out, a power source can be changed to the other power supply automatically. Therefore, even if either one of the power supply stops, the influence of the interruption can be prevented.

THE BEST MODE FOR CARRYING OUT THE INVENTION

Figure 1:
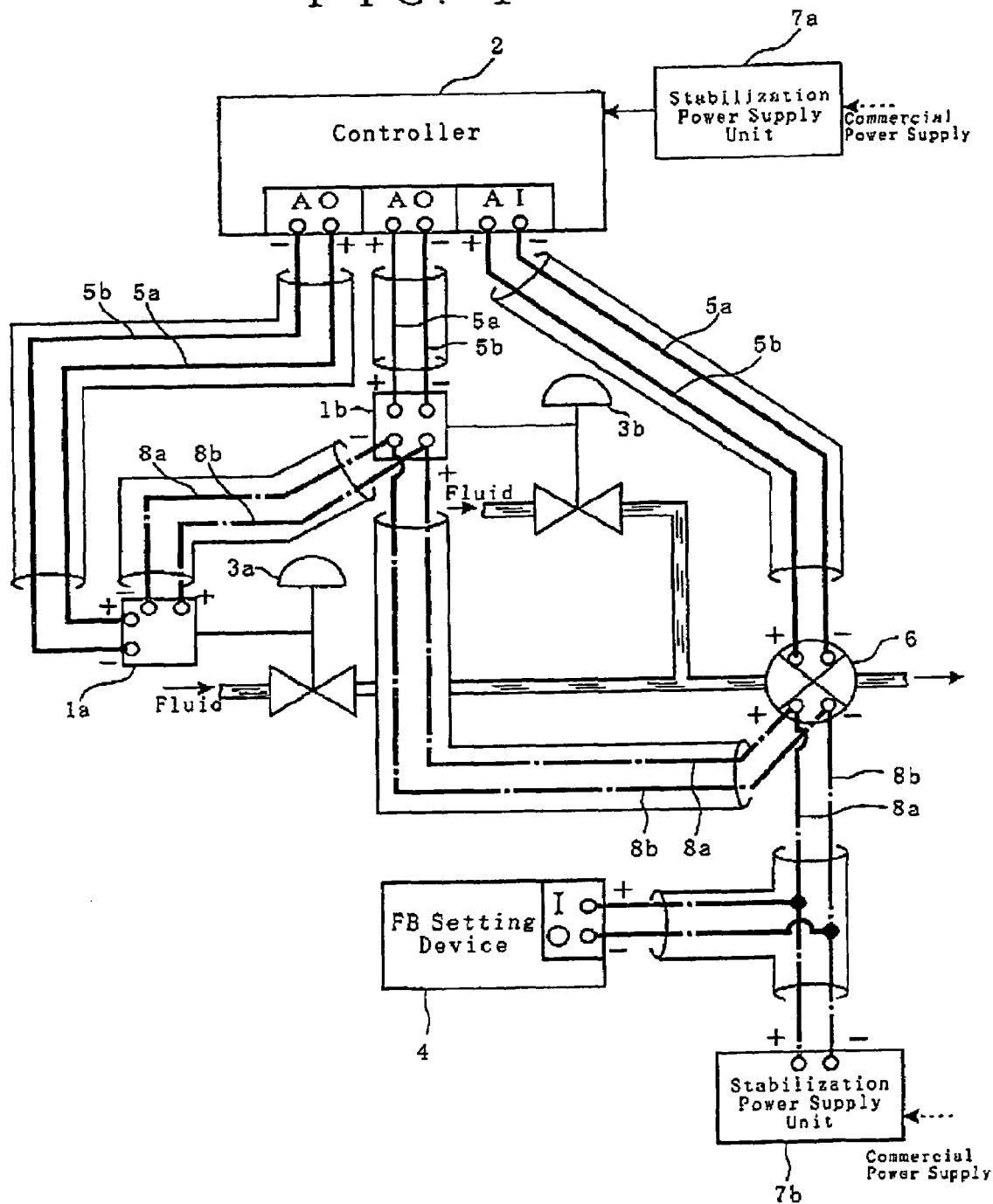
FIG. 1 shows an embodiment of a control system constituted by using a positioner of the present invention.

FIG. 1 shows a control system using a positioner of an embodiment of the present invention. The positioners 1a, 1b are a form of a field apparatus of the invention and have a positioning function to control a valve position of the valves 3a, 3b in response to a control signal from a controller 2. Each positioner 1a, 1b and the controller 2 are connected by a 4-20 mA communication cable 5a, 5b of two-line type respectively. Each positioner 1a, 1b controls the valve position of each valve 3a, 3b based on the control signal transmitted through the communication cable 5a, 5b from the controller 2 (following "4-20 mA signal"). The control signal transmitted from the controller 2 determines the PID parameter as opposed to each positioner 1a, 1b and is generated so that detection data of a flow quantity transmitter 6 provided downstream of the valves 3a and 3b is a predetermined target value in the controller 2. Each positioner 1a, 1b moves by electric power supplied through the 4-20 mA communication cable 5a, 5b from a stabilization power-supply unit 7a converted to the controller 2.

Each positioner 1a, 1b has also a function to diagnose operation circumstances of its own operation circumstances and the valve 3a, 3b. Information of a diagnosis result (hereinafter "diagnosis information") is transmitted through the FB communication cable 8a, 8b of two-line type to the FB setting device 4 which does the setting and the management of each field apparatus. Moreover, each positioner 1a, 1b comprises a communication function that can receive setting information from the FB setting device 4 via the FB communication cable 8a, 8b.

An electric power necessary for movement of the above positioner 1a, 1b is supplied through the 4-20 mA communication cable 5a, 5b from the stabilization power-supply unit 7a of the controller 2 side. However even if this power supply was cut, the positioner 1a, 1b are composed to receive the power supply through the FB communication cable 8a, 8b. Switches that can switch between the power supplied via the 4-20 mA communication cable 5a, 5b and the power supplied via the FB communication cable 8a, 8b are comprised inside the positioners 1a, 1b. The electric power supplied via the FB communication cable 8a, 8b is supplied by the stabilization power-supply unit 7b which is different from the stabilization power-supply unit 7a of the controller 2 side.

Figure 2:
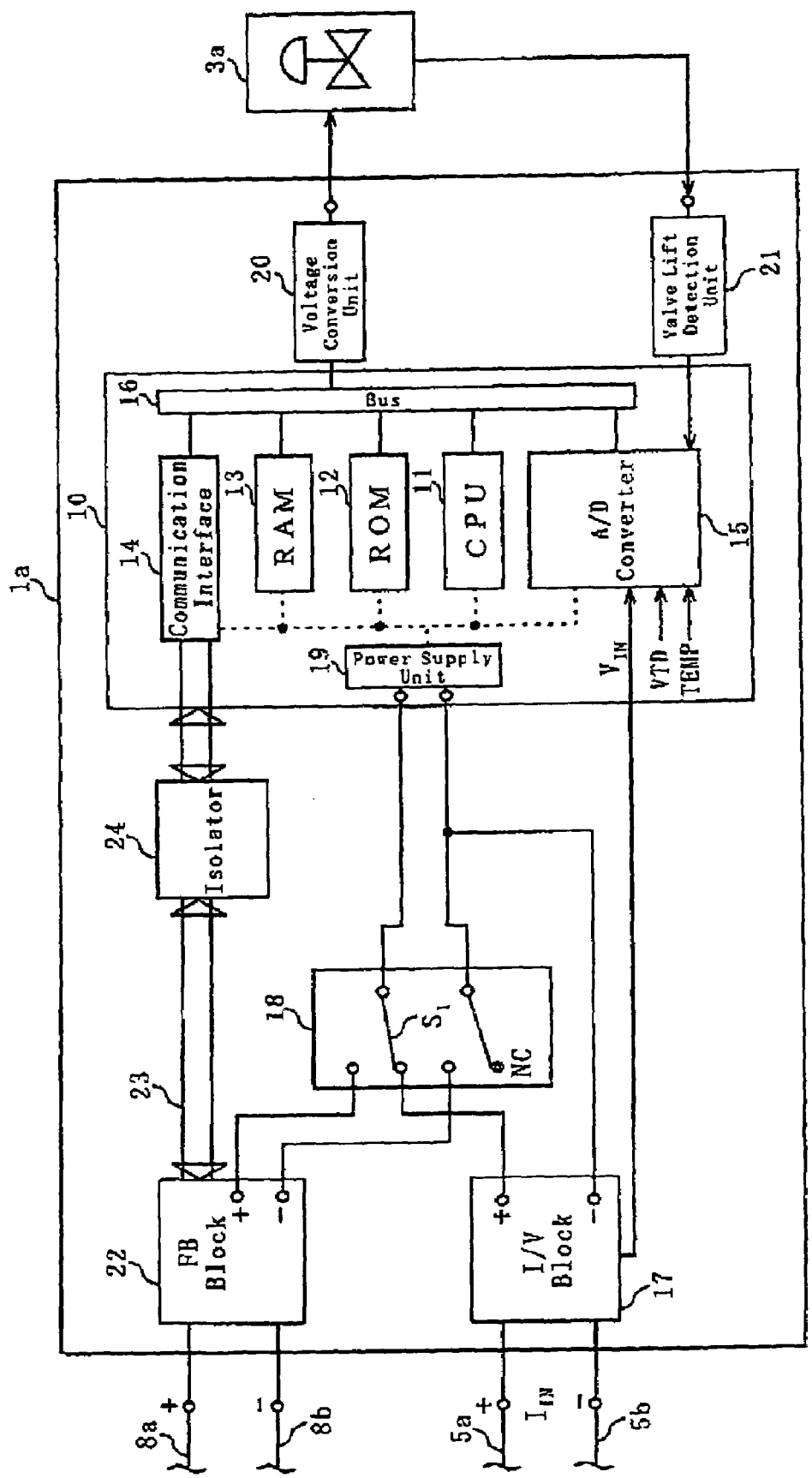
FIG. 2 shows a circuit composition of a positioner of an embodiment.

FIG. 2 shows a circuit constitution of the positioner 1a. This circuit comprises an arithmetic processing unit 10, a voltage conversion unit 20, a valve lift detection unit 21, an I/V block 17, an FB block 22, and a power supply changeover unit 18.

The arithmetic processing unit 10 includes a CPU 11, a ROM 12, a RAM13, a communication interface 14, an A/D converter 15 and a power supply unit 19 connected through a bus 16.

The CPU 11 functions as a diagnosis unit generating diagnosis information based on an input signal from various sensors (not shown) arranged for diagnoses. The diagnosis information is sent to the FB block 22 through the communication interface 14 and is transmitted toward the FB setting device 4 via the FB communication cable 8a, 8b from the FB block 22. Various sensors are arranged for diagnoses and may be embodied as an air pressure sensor, a supersonic wave sensor, or a temperature sensor.

The 4-20 mA signal sent via the communication cable 5a, 5b from the controller 2 distributes a 1-3 V voltage signal or a power supply electric current in the I/V block 17 and is an example of an analog communications means. While the power supply electric current is supplied to the power supply unit 19 of the arithmetic processing unit 10 through a switch $S_1$ of the power supply changeover unit 18, a voltage signal is converted into a digital signal at the A/D converter 15. In response to the CPU 11 getting a deviation between this digital signal and a later valve lift signal, a valve lift control signal which establishes a control quantity of the valve position of the valve 3a is generated and is output from the voltage conversion unit 20. The voltage conversion unit 20 includes a well-known converter circuit that converts the valve lift control signal to an air pressure signal and the valve position of valve 3a is controlled by the air pressure signal after the conversion. The valve lift detection unit 21 includes a well-known detection circuit that converts stem displacement of the valve 3a to the voltage signal of 1-3 V. The detection signal is converted to the digital signal by the above A/D converter 15 and the above valve lift control signal is used for generation.

On the other hand, the digital signal sent via the FB communication cable 8a, 8b from the FB setting device 4 is distributed as a signal showing the setting information from the FB setting device 4 or a power supply electric current in the FB block 22 that is an example of the bidirectional digital communication means. While the power supply electric current is supplied to the power supply unit 19 of the arithmetic processing unit 10 through the switch $S_1$ of the power supply changeover unit 18, the setting information signal is inputted through a channel 23 into the communication interface 14 after noise removal in an isolator 24. The CPU 11 executes various setting processing in response to the setting signal received through the communication interface 14.

As shown in FIG. 2, the power supply changeover unit 18 of this positioner 1a includes usually a condition that the switch S1 connects to the I/V block 17 and the power supply electric current from the I/V block 17 is supplied to the power supply unit 19. But the connection of this switch $S_1$ is a manual switch that can be changed to the FB block 22 side by manual operation. Accordingly, even if the electric power from the controller 2 is not supplied, it is changed to supply of the power supply from the FB setting device 4 by switching a condition of this switch.

Figure 3:
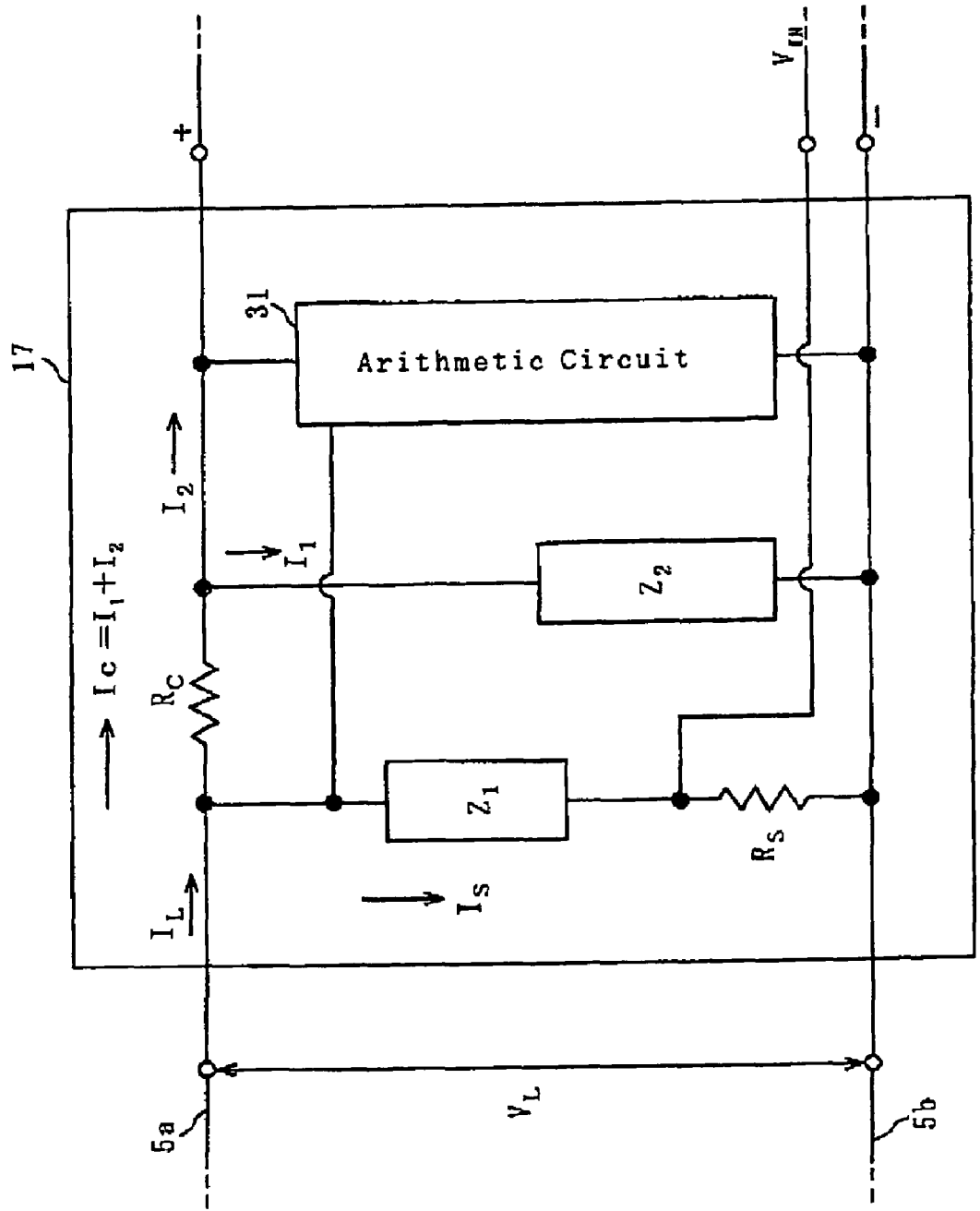
FIG. 3 shows a circuit composition of an I/V block.

FIG. 3 shows circuit constitution of the I/V block 17. Between the 4-20 mA communication cable 5a and 5b, the I/V block 17 connects a series circuit between a transistor as first variable impedance device Z1, and a resistor as impedance device RS for reception. And a transistor as a second variable impedance device $Z_2$ is connected to the series circuit of resistor $R_C$ in parallel with these. At the same time an arithmetic circuit 31 is connected in parallel with the device $Z_2$ and and receives output from both terminals of this arithmetic circuit 31. While the arithmetic circuit 31 controls the impedance of the device $Z_1$ in the course (for example, 10 mA) keeping the line voltage $V_L$ of the 4-20 mA communication cable 5a, 5b, the impedance of the device $Z_2$ is controlled in the course (for example, 4 mA) keeping an electric current $I_C$ flowing in the resistor $R_C$. If the electric current which is passed in the device $Z_2$ is $I_1$, the output electric current of the I/V block 17 becomes $$I_2 = I_C - I_1$$

In the circuit of FIG. 3, if a track line electric current of the 4-20 mA communication cable 5a, 5b is $I_C$, the electric current passing the series circuit between the first variable impedance device Z1 and the resistor $R_S$ is $$I_S = I_L - I_C$$

Therefore, for example, $I_S$ becomes only a signal electric current of 0-16 mA by establishing kept $I_C$ (for example, 4 mA) as a bias ingredient. Without giving influence on the reception of the signal shown by this $I_S$, the power supply electric current $I_2$ of maximum 4 mA can be supplied to the power supply unit 19 stably through the switch $S_1$ of FIG. 2. On the other hand, for example, the terminal voltage $V_{IN}$ of the resistor $R_S$ (=$R_S I_S$) is inputted into the A/D converter 15 as the voltage signal of 1-3 V.

Figure 4:
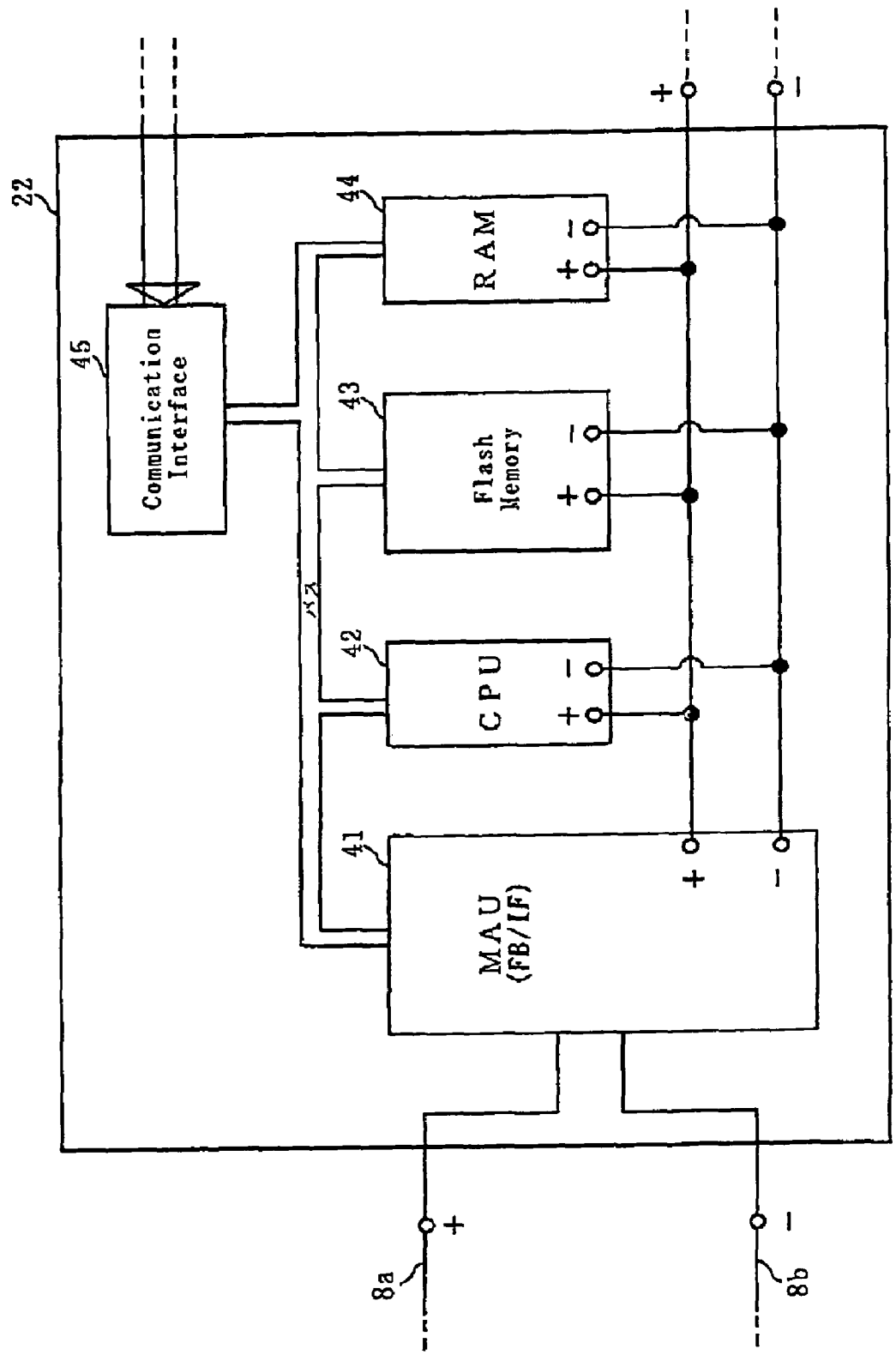
FIG. 4 shows a circuit composition of a FB block.

FIG. 4 shows circuit constitution of the FB block 22. This FB block 22 comprises a MAU (Media Attachment Unit) 41, a CPU 42, a flash memory 43, a RAM 44 and a communication interface 45.

The MAU 41 distributes the transmission signal from the FB communication cable 8a, 8b as a power supply electric current and the digital signal as the setting information, and comprise a function to transmit the diagnosis information of the positioner toward the FB setting device 4. The power supply electric current is supplied as the power supply for operation of the FB block 22, and when a condition of the switch $S_1$ of FIG. 2 is switched from an as described before usual condition, the power supply electric current from the transmission signal and output by the MAU 41 is supplied to the power supply unit 19. On the other hand, the digital signal as the setting information is processed in the CPU 42, and is transmitted through the transmission channel 23 from the communication interface 45 to the arithmetic processing unit 10. The CPU 11 inside the arithmetic processing unit 10 processes the monitoring and the adjustment of the output value of the positioner based on this setting information, and various diagnosis information obtained on the basis of these is transmitted toward the FB setting device 4 through the FB block 22.

The flash memory 43 stores a program for the FB communication, and the RAM 44 stores a variable for the FB communication.

Figure 5:
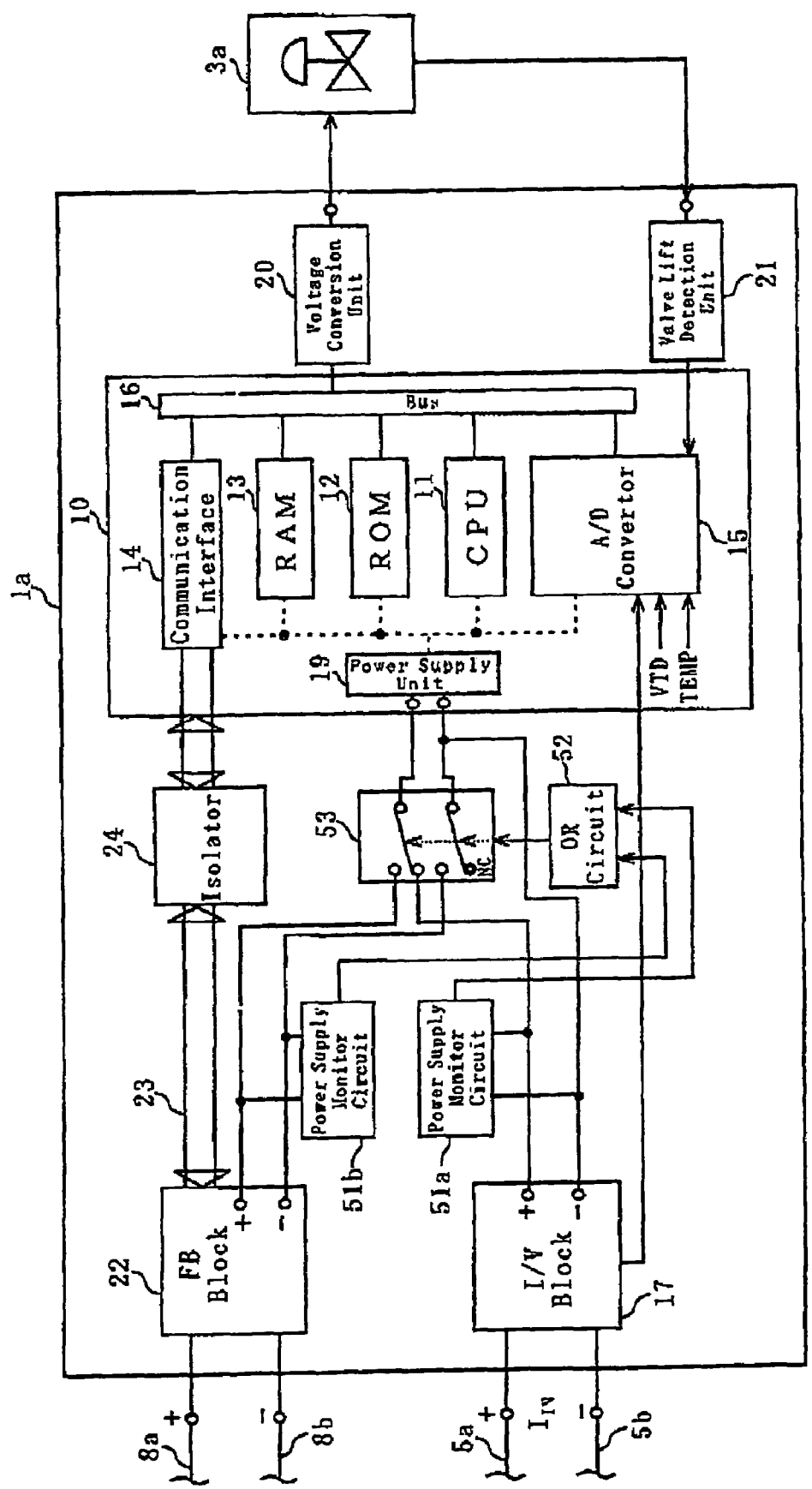
FIG. 5 shows another embodiment of a control system constituted by using a positioner of the present invention.

FIG. 5 shows the circuit constitution to switch the power supply from the I/V block 17 side and the power supply from the FB setting device 4 side in response to circumstances automatically in the positioner 1a. In this circuit constitution, the respective power supply monitor circuit 51a, 51b are connected to each output port of the I/V block 17 and the FB block 22 and it always watches the output electric current from the I/V block 17 and the FB block 22. The outputs, which indicates power supply status of respective ones of the power supply monitor circuits 51a and 51b are input to an OR circuit 52, and the output of this OR circuit 52 becomes the setting signal of an automatic changeover switch 53. That is, the OR circuit 52 sends the signal in response to the monitor output from either power supply monitor circuit 51a or 51b to the automatic changeover switch 53. The automatic changeover switch 53 is set at a power supply condition to control the switch 53 to use power from the I/V block 17 side or the power supply condition from the FB block 22 side by an input signal which is the output of the OR circuit 52.

In normal practice, this automatic changeover switch 53 is usually set on the condition to supply the power supply electric current from the I/V block 17 for the power supply unit 19. If the output electric current runs out in the power supply monitor circuit 51a of the I/V block 17 side, the output from the OR circuit 52 changes. Therefore the automatic changeover switch 53 is switched to the condition that supplies the power supply electric current from the FB block 22 for the power supply unit 19. If the output runs out in the power supply monitor circuit 51b of the FB block 22 side in this condition, the output from the OR circuit 52 changes. Therefore, the automatic changeover switch 53 returns to the usual condition that supplies the power supply electric current from the I/V block 17 for the power supply unit 19.

In these circumstances, though the positioner of embodiment was explained, the present invention is not limited to the positioner and can apply to other field apparatuses (for example, the measurement apparatus such as the differential pressure transmitter).

What is claimed is:

1. A positioner interfaceable with a controller and a field bus setting device to control a valve to be set to a position, comprising:
    a 4-20 mA communication cable from the controller located outside the positioner;
    an analog communications means receiving an analog signal through the 4-20 mA communication cable from the controller located outside and executing a control of the position of the valve and other predetermined functions based on a control signal received from the controller in the form of the analog signal;
    a diagnosis unit diagnosing abnormality of the positioner or the valve;
    a bidirectional digital communication cable in addition to the analog communication cable; and
    a bidirectional digital communication means to send a digital signal through the bidirectional digital communication cable which shows a diagnosis result of the diagnosis unit to the field bus setting device outside the positioner and to receive a digital signal containing setting information from the field bus setting device through the bidirectional digital communication cable.

2. The positioner according to claim 1, wherein:
    the analog communication means derives electric power from the analog signal and supplies the electric power as output; and
    a bidirectional digital communication means derives electric power from the digital signal received and supplies the electric power as output; and
    the positioner further comprises a selectable switching means for selecting the electric power that is supplied by the analog communication means or the electric power that is supplied by the directional digital communication means as a electric power for operation of the positioner.

3. The positioner according to claim 1, wherein:
    the analog communication means derives electric power from the analog signal and supplies the electric power as output; and
    the bidirectional digital communication means derives electric power from the digital signal received and supplies the electric power as output; and
    the positioner further comprises an automatic switching means for selecting one of the electric power supplied from the analog communications means or the electric power supplied from the bidirectional digital communication means as a selected power for operation of the positioner, and switching automatically to select another one of the electric power supplied from the analog communications means and the electric power supplied from the bidirectional digital communication means if the selected power supply ceases supplying power.

4. The positioner of claim 3 wherein the analog signal is a 4-20 mA analog communication signal.

5. The positioner of claim 2 wherein the analog signal is a 4-20 mA analog communication signal.

6. The positioner of claim 1 wherein the analog signal is a 4-20 mA analog communication signal.

7. A positioner interfaceable with a controller and a field bus setting device to control a valve to be set to a position, comprising:
   an analog communication cable;
   an analog communications device configured to receive an analog control signal in the range of 4 to 20 mA through analog communication cable from the controller located outside and to control of the position of the valve based on the analog control signal;
   a diagnosis unit diagnosing an abnormality of the positioner or the valve;
   bidirectional digital communication cable provided in addition to the analog communication cable; and
   a bidirectional digital communication device configured to send a digital signal through the bidirectional digital communication cable, which shows a diagnosis result of the diagnosis unit to the field bus setting device outside the positioner and to receive a digital signal containing setting information from the field bus setting device through the bidirectional digital communication cable.

8. The positioner according to claim 7, further comprising:
   the analog communication device extracting electric power from the analog signal and supplying the electric power as output;
   the bidirectional digital communication means extracting electric power from the digital signal received and supplying the electric power as output; and
   a switch accepting the electric power output by the analog communications means and the electric power output by the bidirectional digital communication means and being settable to select one of the electric power output by the analog communications means and the electric power output by the bidirectional digital communication means as a power supply for operating the positioner.

9. The positioner according to claim 8, further comprising:
   said switch being controllable by a switch control signal; and
   an automatic switch setting device configured to detect cessation of the power applied as the power supply for operating the positioner and to provide said switch control signal so as to switch said switch to apply another one of the electric power output by the analog communications means and the electric power output by the bidirectional digital communication means as a power supply for operating the positioner in response to detection of the cessation of the power applied as the power supply.

10. The positioner according to claim 9, wherein the analog communication cable and the digital communication cable are separately housed.

11. The positioner according to claim 8, wherein the analog communication cable and the digital communication cable are separately housed.

12. The positioner according to claim 7, wherein the analog communication cable and the digital communication cable are separately housed.

13. The positioner according to claim 3 wherein the analog communication cable and the digital communication cable are separately housed.

14. The positioner according to claim 2 wherein the analog communication cable and the digital communication cable are separately housed.

15. The positioner according to claim 1 wherein the analog communication cable and the digital communication cable are separately housed.

* * * * *